Feb. 14, 1933.  W. D. ANTRIM  1,897,879
SAFETY DEVICE FOR ELECTRIC OVENS
Filed June 29, 1931   2 Sheets-Sheet 1
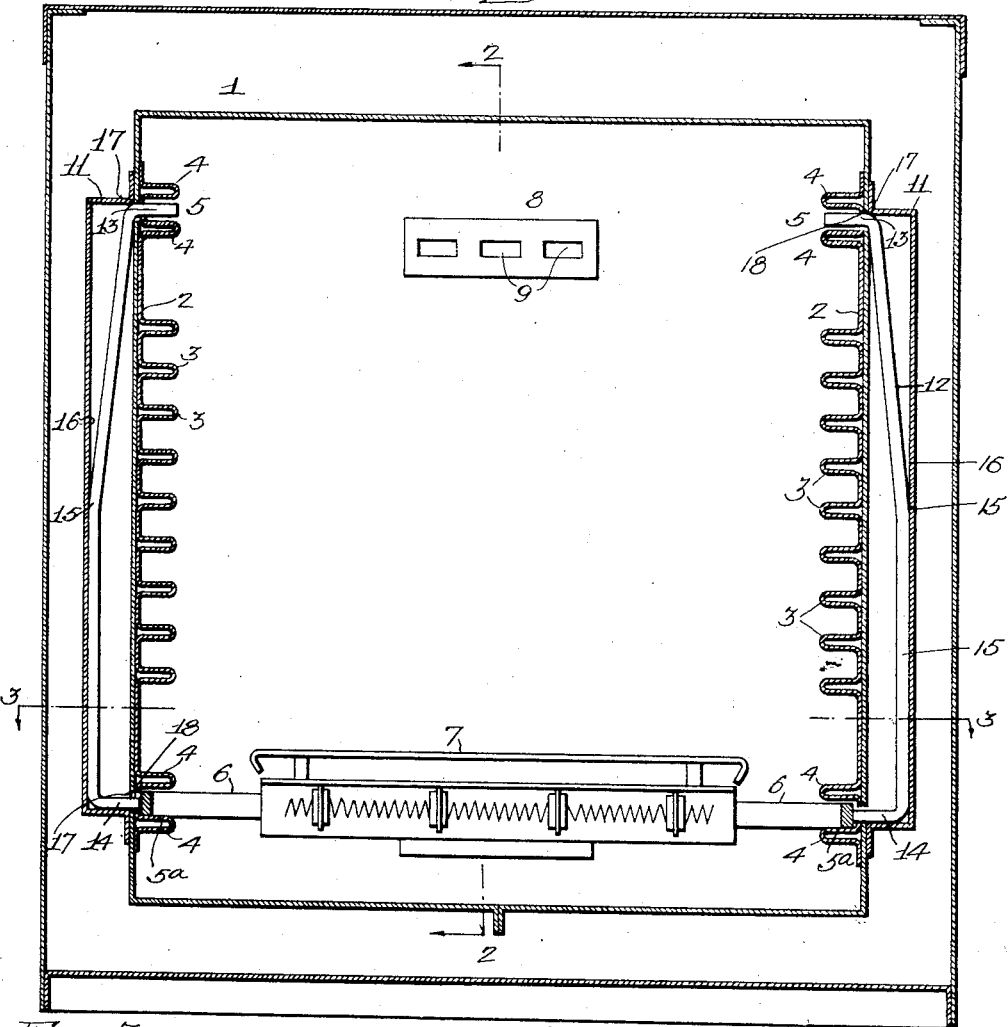
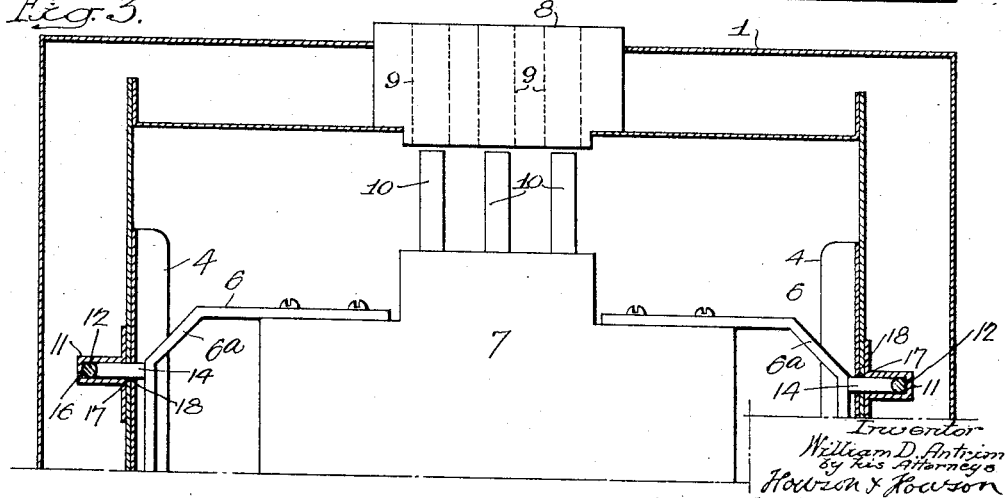

Feb. 14, 1933.   W. D. ANTRIM   1,897,879
SAFETY DEVICE FOR ELECTRIC OVENS
Filed June 29, 1931   2 Sheets-Sheet 2
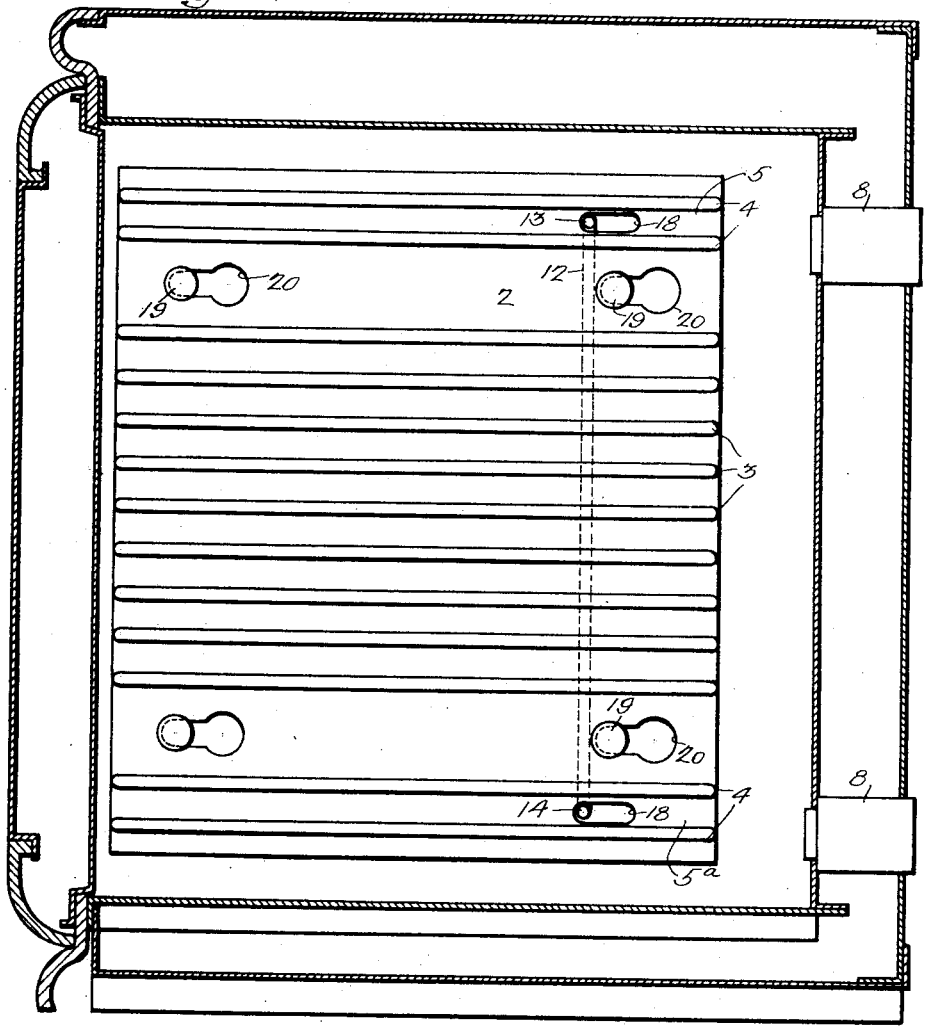
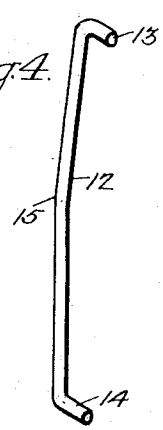
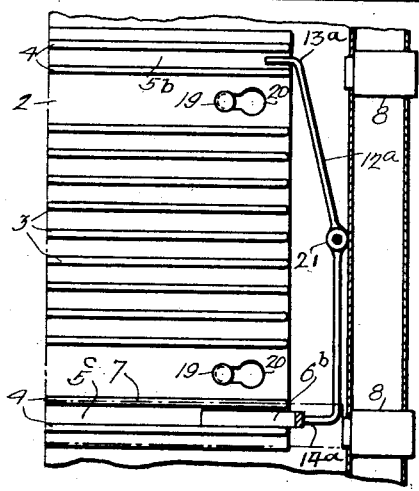
Inventor:
William D. Antrim
by his Attorneys
Howson & Howson Patented Feb. 14, 1933

1,897,879

UNITED STATES PATENT OFFICE

WILLIAM D. ANTRIM, OF GLOUCESTER, NEW JERSEY, ASSIGNOR TO ROBERTS & MANDER STOVE COMPANY, OF PHILADELPHIA, PENNSYLVANIA, A CORPORATION OF PENNSYLVANIA

SAFETY DEVICE FOR ELECTRIC OVENS

Application filed June 29, 1931. Serial No. 547,730.

This invention relates to certain improvements in electric ovens in which a removable electric element is used and which can be placed in one of two positions, one position being for broiling and the other for baking.

The object of this invention is to prevent the use of two separate heaters in a single oven. This object I attain in the following manner, reference being had to the accompanying drawings, in which:

Fig. 1 is a sectional elevation of an electric oven illustrating my invention and showing the electric element located in the lower portion of the oven for baking;

Fig. 2 is a sectional view on the line 2—2, Fig. 1, showing one of the rack guides and the electric element removed;

Fig. 3 is a sectional plan view on the line 3—3, Fig. 1;

Fig. 4 is a detached perspective view of the safety device; and

Fig. 5 is a view showing the safety device located in a different position from that shown in Fig. 1.

1 is the oven of an electric range. 2—2 are the rack guides, one located at each side of the oven. In the present instance these rack guides are made from sheet metal bent to form the guides 3 spaced a given distance apart to support the trays on which the material to be broiled or baked is mounted. At the upper and lower portion of the rack guides in the present instance are supports 4, spaced a given distance apart to form grooves 5—5a at the upper and lower part of the oven, respectively, for the side frames 6 of the electric heater 7. This heater may be of any ordinary type. Located within the casing of the oven 1 is an electrical connector receptacle 8, which has perforations 9 into which project the contact blades 10 of the heater 7. Within the oven casing at each side of the oven is a narrow box 11, in which is located a safety bar 12, in the form of a rocker, shown clearly in the attached view, Fig. 4. Each bar is bent to form an upper projection 13 and a lower projection 14, and is bent at the center to form a fulcrum 15 which rests against the back 16 of the box 11. The upper projection 13 of each rocker extends through a hole 17 in the oven casing 1 and through an elongated slot 18 in the rack guide 2, and projects into the groove 5 for the frame 6 of the heater 7. The lower projection 14 extends through a similar hole 17 and a slot 18 in the casing and rack guide, respectively, and extends into the groove 5a for the frame of the heater. When the heater 7 is to be located in the bottom of the oven 1 for baking, then it is pushed into the groves 5—5a in the rack guide and the frame 6 at each side of the heater slides in these grooves. Each frame is beveled at 6a at its inner end, as shown in Fig. 3, so as to push the projection 14 of each rocker 12 into the box. This movement causes the rocker to pivot at its fulcrum 15 and forces the projection 13 of each rocker into the upper grooves 5. The frame 6 of the heater, while in position in the oven, prevents the rocking of the rockers, so that it is impossible to place a second heater in position in the upper portion of the oven when the heater is located in the lower portion. The heater can be readily placed in the upper portion by removing it entirely from the lower grooves 5a, which will release the rockers and then sliding it in the grooves 5 in the upper portion of the oven, the rockers will be turned on their fulcrums as the upper projections 13 are pushed into their slots and the lower projections 14 will be forced out into the grooves 5a, preventing the insertion of a heater in the lower grooves while the heater is in the upper grooves. The rack guides 2 are detachably secured, in the present instance, to the inner casing of the oven by headed bolts 19, which are adapted to slots 20 in the rack guides, the slots being increased in size at one end so as to allow for the insertion of the racks in position over the heads of the bolts 19 and then by moving the rack guides longitudinally the heads of the bolts overlap the edges of the slots, holding the rack guides firmly in position. The rack guides are slotted at 18 to allow for this movement.

In Fig. 5 a modification of the invention is shown in which the rocker is located at the rear of the oven. This rocker consists of a two-armed lever 12a pivoted at 21 to the side wall of the oven and has an upper projection 13a extending into the groove 5b and the lower projection 14a extending into the lower groove 5c. The heater in this instance has rectangular frames 6b extending from each side thereof, which are adapted to the grooves 5b and 5c and when the heater is inserted in either of the grooves it strikes one of the projections on the lever 12a, turning it on its pivot. For instance, if the heater is in the lower grooves as shown in Fig. 5, the upper projection 13a will extend into the upper groove 5b and prevent a heater, inserted in the upper grooves, from making contact with the upper connector receptacle 8. If the heater is withdrawn from the lower groove, then it can be inserted in the upper grooves and the upper end of the lever will be pushed by the heater, turning the lever on its pivot so as to force the lower projection 14a into the lower groove 5c, preventing the insertion of another heater in the lower groove while the heater is in the upper groove.

In Fig. 1 of the drawings I have shown two rockers, one at each side of the oven, but it will be understood that in some instances a single rocker may be used without departing from the essential features of the invention, and while the two rockers are shown near the rear of the oven, it will be understood that the rockers may be placed at the front of the oven or at any intermediate point between the front and the back, without departing from the essential features of the invention.

While in the drawings the supports for the heater are shown as made of plates having upper and lower guides formed by corrugating the plates into which the heater frames can slide, it will be understood that the upper and lower supports for the heater can be made in any form without departing from the essential features of the invention.

I claim:

1. The combination of an electric oven having upper and lower grooves for an electric heater; a rocker located in the oven having projections extending into the upper and lower grooves; and an electric heater arranged to be inserted in either the upper or lower grooves of the oven, the projections of the rocker being in the path of the heater, so that when it is inserted in the oven and its terminal blades are in contact with the connecting receptacle of the oven, the projection at the opposite end of the rocker will extend into one of the upper grooves, preventing the insertion of a second heater when a heater is in the other grooves.

2. The combination in an oven for an electric range having upper and lower grooves at each side of the oven; a connector receptacle at the back of the oven; a box at each side of the oven; a rocker in each box having upper and lower projections adapted to extend into the grooves for the heater; and a heater having a frame adapted to the grooves, said frames when the heater is inserted in one of said grooves, forcing the projections of the rocker out of the grooves, the movement of the rocker causing the projections at the other end of the rocker to be extended into the other grooves, preventing the blades of a second heater inserted in the grooves from making contact with the connector receptacle.

3. The combination in an electric oven having upper and lower grooves at each side of the oven; a connector receptacle at the back of the oven; a rocker at each side of the oven having upper and lower projections adapted to extend into the grooves for the heater; and a heater having the frame adapted to the grooves, each frame being beveled at the inner end so that when the heater is placed in one set of grooves the beveled portions of the frames will force back the projections of the rockers at the grooves on which the heater is mounted, causing the projections to extend into the other grooves, and preventing the insertion of a second heater.

4. The combination of an electric oven having upper and lower grooves for an electric heater; a mechanical device having projections arranged to extend into the grooves; and an electric heater designed to be inserted in either the upper or lower grooves of the oven, so that when it is inserted in one of said grooves it will actuate the mechanical device so that said device will be projected into the other groove and prevent the insertion of another electric heater in said last-mentioned groove.

WILLIAM D. ANTRIM.